(12) United States Patent
Suranyi et al.

(10) Patent No.: US 6,201,721 B1
(45) Date of Patent: Mar. 13, 2001

(54) BUS HOLDUP CIRCUIT FOR A DISTRIBUTED POWER SYSTEM AND METHOD OF OPERATION THEREOF

(75) Inventors: Gabriel G. Suranyi; Vijayan J. Thottuvelil, both of Plano, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/558,939

(22) Filed: Apr. 26, 2000

(51) Int. Cl.[7] .................................... H02M 1/00
(52) U.S. Cl. ..................... 363/144; 323/908; 307/147
(58) Field of Search .................... 363/141, 144, 363/147; 323/908; 307/147

(56) References Cited

U.S. PATENT DOCUMENTS 5,726,506 * 3/1998 Wood ................................ 307/147
5,940,288 * 8/1999 Kociecki ............................ 363/144

* cited by examiner

Primary Examiner—Jessica Han

(57) ABSTRACT

A bus holdup circuit for a module of a distributed power system, a method of bolstering bus voltage and a distributed power system employing the circuit or the method. In one embodiment, wherein the module has a backplane interface adapted to be removably coupled to a DC backplane of the distributed power system, the bus holdup circuit includes: (1) an energy storage circuit, coupled across the backplane interface, adapted to store and dissipate energy to bolster a voltage across the DC backplane and (2) an inrush limiting circuit, series-coupled to the energy storage circuit, adapted to limit an inrush current to the module.

20 Claims, 1 Drawing Sheet

BUS HOLDUP CIRCUIT FOR A DISTRIBUTED POWER SYSTEM AND METHOD OF OPERATION THEREOF

TECHNICAL FIELD OF THE INVENTION

The present invention is directed, in general, to power distribution and, more specifically, to a bus holdup circuit, a method of bolstering a bus voltage associated with a distributed power system and a distributed power system employing the circuit or the method.

BACKGROUND OF THE INVENTION

Telecommunications and computer systems may be deployed in a wide variety of conditions other than an office environment. These systems are often packaged as a collection of modules or circuit boards connected to a primary power bus that distributes power to each of the individual modules or circuit boards. The primary power is generally a DC voltage of a value, such as 48 volts.

A major concern in such a distributed power system is the impact that a single module or circuit board can have on the power system if the module or circuit board were to become faulted, leading to a decrease in the voltage of the primary power bus. This, of course, would adversely affect the operation of the remaining operational modules or circuit boards. This may cause a catastrophic failure of the entire telecommunication or computer system, rather than perhaps the loss of just a single feature or function associated with the faulted module or circuit board.

Presently, distributed power systems attempt to address this problem using two basic strategies. The first strategy is directed to enhancing the transient energy delivery capability of the primary power bus by a direct addition of energy storage capability to the bus itself. This usually takes the form of adding capacitors across the primary power bus that, under a fault condition, may be used to supply energy to the circuit boards in an attempt to maintain the bus voltage.

The second strategy attempts to isolate each of the modules or circuit boards from the primary power bus in the event that the bus voltage droops. In concert with the isolation of the modules the second strategy also provides an energy storage capability associated with each module. This modularized form of energy storage attempts to maintain the voltage at the individual module despite a droop in the primary power bus.

Although the implementation of these two strategies provides some advantage over the use of a distributed power system that offers no fault isolation capability, each of the modules must basically provide a significant portion of its own energy storage capability, since sharing of energy between the modules is effectively foreclosed by the fault isolation circuitry. This modular energy storage capability is therefore used to deal with a fault on another module which may cause the voltage on the primary power bus to droop significantly, and to deal with a fault condition on the module itself. Of course, the dual role required of the energy storage capability necessitates larger capacity energy storage devices thereby adversely affecting, among other things, the overall cost and size of the distributed power system.

Accordingly, what is needed in the art is a system and method of bolstering a bus voltage associated with a distributed power system that reduces the energy storage required in each module.

SUMMARY OF THE INVENTION

To address the above-discussed deficiencies of the prior art, the present invention provides, for use with a module of a distributed power system having a backplane interface adapted to be removably coupled to a DC backplane of the distributed power system, a bus holdup circuit, method of bolstering a bus voltage associated with the distributed power system and a distributed power system employing the circuit or the method. In one embodiment, the bus holdup circuit includes: (1) an energy storage circuit, coupled across the backplane interface, adapted to store dissipate energy to bolster a voltage across the DC backplane and (2) an inrush limiting circuit, series-coupled to the energy storage circuit, adapted to limit an inrush current to the module.

The present invention, in one aspect, introduces the broad concept of providing a substantially non-dissipative and distributed bus holdup circuit located on a module of a distributed power system. The bus holdup circuit provides energy to the DC backplane during, in part, a fault-clearing transient in the distributed power system. When employing multiple modules with corresponding bus holdup circuits, each bus holdup circuit may contribute collectively to providing energy to a single module or a collection of modules that are involved with either a fault or other transient condition. Further, each bus holdup circuit may limit an inrush current to its associated module.

In one embodiment of the present invention, the energy storage circuit comprises a capacitor. Of course, more than one capacitor may be used with the module as appropriate. In an embodiment to be illustrated and described, each of a plurality of modules of the distributed power system is provided with a bus holdup circuit that contributes to providing an adequate holdup energy without requiring a central bus holdup circuit.

In one embodiment of the present invention, the inrush limiting circuit comprises a resistor. An inrush current limiting resistor allows potentially damaging inrush current to be received and suppressed in a constructive manner. Of course, other components may be used to adequately handle the energy from an inrush current and are well within the broad scope of the present invention.

In one embodiment of the present invention, the bus holdup circuit includes a switch, coupled across the inrush limiting circuit, that allows the energy storage circuit to bolster the voltage. In an embodiment to be illustrated and described, the switch is a diode. Of course, other switches or a combination of switches may be appropriately applied to allow the energy storage circuit to bolster the voltage on the DC backplane. Those skilled in the pertinent art will understand that the present invention is employable with any conventional or later-developed type of switches.

In one embodiment of the present invention, the DC backplane is free of a central bus holdup circuit. The modularized bus holdup circuit allows the central bus to be free of components that may typically have limited service life by distributing such components among the modules. The maintenance of these components may be more easily addressed at the module level rather than at the system level.

In one embodiment of the present invention, the bus holdup circuit enables the module to be hot-pluggable to the DC backplane. The ability to plug and unplug a module from the DC backplane under a powered-up condition greatly simplifies the addition or extraction of a module. This feature allows a group of modules to remain operational thereby avoiding a shutdown of the system when a single module requires service or must otherwise be removed from the system.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
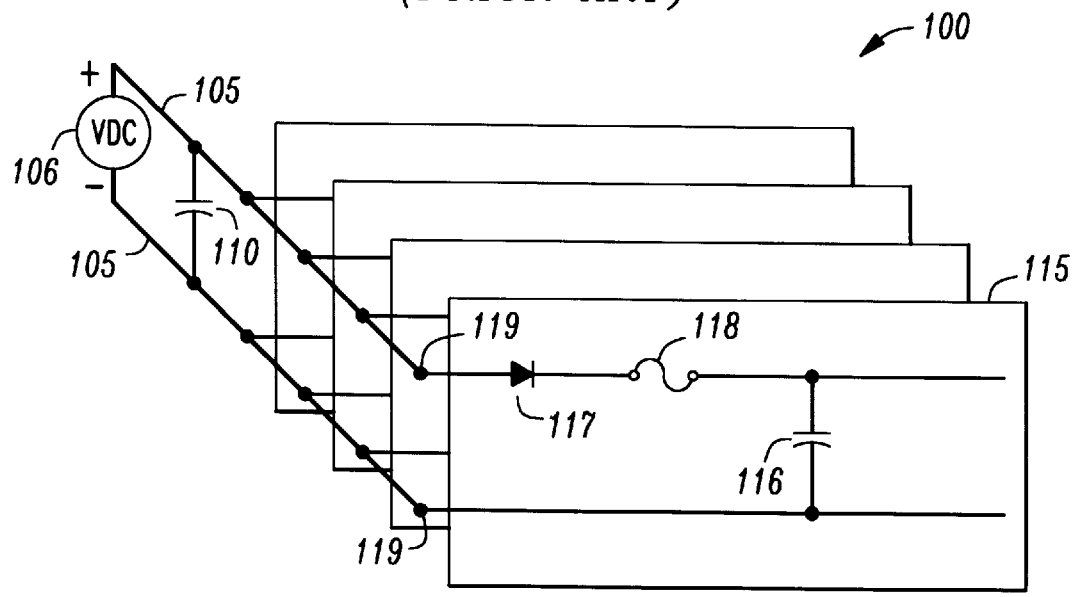
FIG. 1 illustrates a diagram of a prior art distributed power system for use with a collection of modules.

Referring initially to FIG. 1, illustrated is a diagram of a prior art distributed power system 100 for use with a collection of modules. The distributed power system 100 includes a primary distribution bus 105 connected to a source of DC voltage 106, a primary bus filter capacitor 110 and a number of modules (one of which is designated 115) coupled to the primary distribution bus 105. The module 115 includes a module holdup capacitor 116, a module isolation diode 117, a module fault clearing fuse 118 and a module bus connector 119.

The distributed power system 100 is organized to distribute power to all of the modules 115 in such a way as to meet their individual power requirements. Additionally, the distributed power system 100 attempts to isolate each of the modules 115 in such a way as to prevent one or more of the modules 115 that may become faulted from permanently affecting the power distribution to the remaining modules 115 that are operating normally.

The primary distribution bus 105 distributes the DC voltage 106 to each of the modules 115 under a normal operating condition. The modules 115 may typically represent a system or collection of systems wherein each module 115 is a circuit board containing circuits or sub-modules pertinent to the system, which may be a telecommunications system or a computer system. The module isolation diode 117 is used to isolate faults in the module 115 from affecting the other modules. Additionally, the module isolation diode 117 isolates the module 115 from the primary distribution bus 105 in the event that it becomes faulted and its voltage momentarily falls below the normal value of the DC voltage 106.

The module fault clearing fuse 118 is used to disconnect the module 115 from the primary distribution bus 105 in the event that a component on the module 115 becomes permanently faulted and attempts to drag down the voltage of the primary distribution bus 105. Although the voltage on the primary distribution bus 105 may momentarily decrease, the primary bus filter capacitor 110 assists the DC voltage 106 in providing the energy needed to open the module fault clearing fuse 118 thereby allowing the voltage on the primary distribution bus 105 to recover and return to its normal operating value. Opening of the module fault clearing fuse 118 may occur if the fault on the module 115 fails to clear itself in a sufficiently short period of time.

The module holdup capacitor 116 will also provide energy to the faulted component on the module 115 in an attempt to clear the fault before the module fault clearing fuse 118 opens. If a component fault occurs on one of the other modules, affecting the voltage on the primary distribution bus 105, the module holdup capacitor 116 will provide energy to the module 115 to maintain its operation until the fault clears. The module holdup capacitor 116 thereby provides a hold-over function for the module 115. However, this hold-over function is limited to the module 115 separately requiring an individual module holdup capacitor 116 significant for the task. Each of the modules 115 is basically designed to accommodate its own hold-over needs and cannot contribute to the hold-over needs of another module.

Components placed across the primary distribution bus 105, such as the primary bus filter capacitor 110, tend to become worn out with use over a period of time. This characteristic adds a measure of undesired serviceability to the distributed power system 100. Replacement of the primary bus filter capacitor 110, or another component, placed across the primary distribution bus 105 requires that the distributed power system 100 first be powered down. Then, the modules 115 must be removed, the primary bus filter capacitor 110 removed and replaced, the modules 115 replaced and the primary distribution bus 105 powered up. Any procedures pertinent to the modules 115 to bring them back to operating status must then be addressed. This sequence of repair events is intrusive and often unacceptable for many applications. Additionally, the modules 115 may not typically be connected to the primary distribution bus 105 while it is powered up, since the modules 115 are not designed to accommodate inrush currents.

Further, while the module isolation diode 117 is required to isolate the module 115 from the primary distribution bus 105, the presence of the module isolation diode 117 may reduce the efficiency of the distributed power system 100, for example, by about 2%. The module isolation diode 117 may also cause additional heat dissipation.

Figure 2:
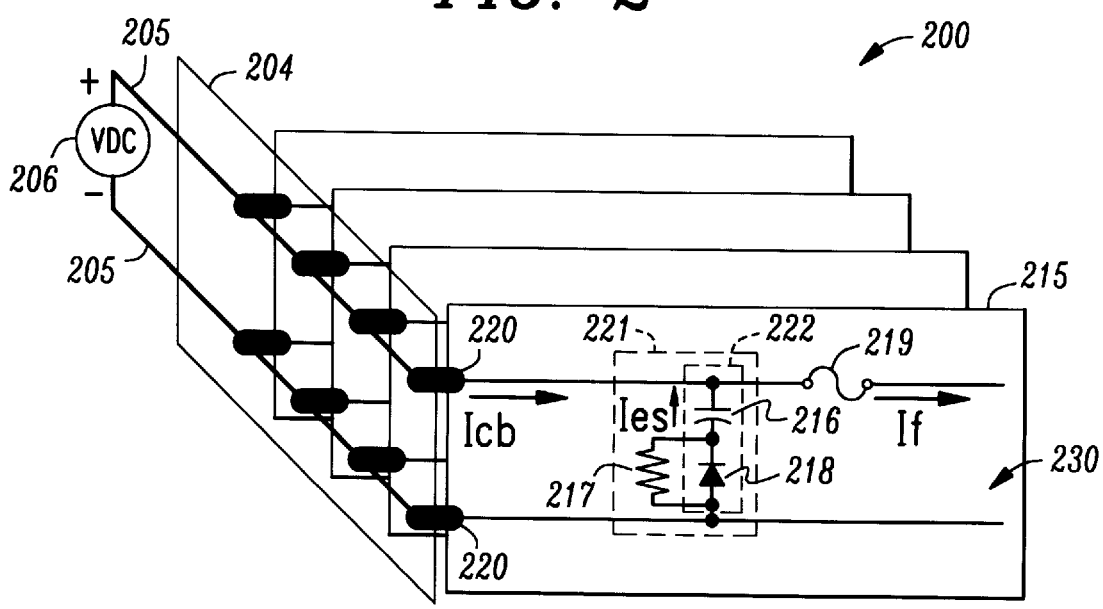
FIG. 2 illustrates a diagram of an embodiment of a distributed power system constructed according to the principles of the present invention.

Turning now to FIG. 2, illustrated is a diagram of an embodiment of a distributed power system 200 constructed according to the principles of the present invention. The distributed power system 200 includes a DC backplane 204 having a central bus 205 connected to a source of DC voltage 206. The distributed power system 200 further includes a number of modules (one of which is designated 215), that are removably coupled to the DC backplane 204. The module 215 includes a circuit board 230 and a backplane interface 220. The module 215 further includes a module fault clearing fuse 219 coupled to the backplane interface 220. The module 215 still further includes a bus holdup circuit 221 having an energy storage circuit 222 coupled across the backplane interface 220 and an inrush limiting circuit (an inrush limiting resistor 217) series-coupled to said energy storage circuit 222. In the illustrated embodiment, the energy storage circuit 222 includes an energy storage capacitor 216 and a bus holdup switch 218 coupled across the inrush limiting resistor 217.

In the illustrated embodiment of the present invention, the modules 215 and the DC backplane 204 provide the main elements of the distributed power system 200. Each of the modules 215 has a backplane interface 220 adapted to be removably coupled to the DC backplane 204. Additionally, each of the modules 215 that is operating in a normal or non-faulted mode may contribute to bolstering the bus voltage in the distributed power system 200 under the momentary condition when at least one of the modules 215 is undergoing a fault condition. The bus holdup circuit 221, associated with each of the modules 215, employs the energy storage circuit 222 to store energy and dissipate the energy to bolster a voltage across the DC backplane 204 under fault conditions. The combined bus holdup circuits 221 provide adequate holdup energy without requiring a central bus holdup circuit to be associated with the DC backplane 204. Additionally, the bus holdup circuit 221 employs the inrush limiting circuit to limit an inrush current to the module 215. The bus holdup circuit 221 does not require the use of a diode in series with the input, further improving efficiency.

In the illustrated embodiment, the energy storage circuit 222 for the module 215 includes the energy storage capacitor 216 and the bus holdup switch 218, which is a diode in this embodiment. Of course, other switches or a combination of switches may be appropriately applied to allow the energy storage circuit 222 to bolster the voltage on the DC backplane 204. Those skilled in the pertinent art will understand, however, that the present invention is employable with any conventional or later-developed switch topology.

In a normal operating mode, the energy storage capacitor 216 is substantially charged to the value of the DC voltage 206 occurring on the central bus 205. When the module 215 is in a faulted mode, the energy storage capacitor 216 provides energy to the module 215 in an attempt to clear the fault. A fault current If flows through the fault clearing fuse 219, directed to the fault. This fault current If is provided, in part, from a module energy storage current Ies that flows through the energy storage capacitor 216 and the bus holdup switch 218. Additionally, a central bus current Icb adds to the energy storage current Ies to form the total module fault current If. If the energy storage capacitor 216 becomes faulted, a central bus current Icb that is no greater than an inrush current would be directed through the energy storage capacitor 216 since the inrush current would be limited by the inrush limiting resistor 217.

In this case, each of the energy storage capacitors associated with the other modules combine to form an equivalent holdup capacitance for the central bus 205 that supplies the central bus current Icb. These currents continue until either the fault clears or the fault clearing fuse 219 opens. Therefore, it is seen that both the module 215 experiencing a fault and the other modules operating normally contribute to attempting to clear the fault. This equivalent central holdup capacitance, supplied by the nonfaulting modules, provides the function of a dedicated central bus capacitor without having the disadvantage associated with an actual physical capacitor permanently attached to the central bus 205, as discussed earlier.

The bus holdup circuit 222 associated with the module 215 allows the central bus 205 to be free of components that may typically have a lifetime that is somewhat limited. By distributing such components among the modules, which may contain several such components, the maintenance of these components may be much better addressed.

Another advantage of the separate energy storage circuits combining to form an equivalent central holdup capacitance in the distributed power system 200 is that the individual energy storage capacitor may be smaller in value for a given module than the individual module holdup capacitor 110 associated with the distributed power system 100 of FIG. 1. Additionally, a larger total number of modules would typically allow for smaller values of individual energy storage capacitors in the distributed power system 200.

The inrush limiting circuit, which takes the form of the inrush limiting resistor 217 in the illustrated embodiment, allows a potentially damaging inrush current to be received and suppressed in a non-damaging manner. Of course, those skilled in the art will realize that there are other components that may be used to adequately handle the energy from an inrush current. An inrush current occurs when a module that is powered-down is connected to a central bus 205 that is powered-up. Unless the initial power current flowing into the module is limited as with the inrush limiting resistor 217 for the module 215, it is typically large enough to damage components thereon. The ability to adequately accommodate inrush current enables the module 215 to be hot-pluggable to the DC backplane 204. The ability to plug and unplug a module 215 from the DC backplane 204 under a powered-up condition greatly simplifies the addition or extraction of the module 215. This feature allows the collection of modules to remain operational thereby avoiding a shutdown of the systems comprised by the collection of modules in many instances.

In summary, the present invention introduces a substantially non-dissipative and distributed bus holdup circuit supported by the modules of a distributed power system. The module bus holdup circuit provides energy to the DC backplane during, in part, a fault-clearing transient in the distributed power system. Other advantages and benefits of the present invention include higher overall efficiencies, a typically lower number of components and higher overall reliability.

Although the present invention has been described in detail, those skilled in the art should understand that they can make various changes, substitutions and alterations herein without departing from the spirit and scope of the invention in its broadest form.

What is claimed is:

1. For use with a module of a distributed power system having a backplane interface adapted to be removably coupled to a DC backplane of said distributed power system, a bus holdup circuit, comprising:

an energy storage circuit, coupled across said backplane interface, adapted to store and dissipate energy to bolster a voltage across said DC backplane; and an inrush limiting circuit, series-coupled to said energy storage circuit, adapted to limit an inrush current to said module.

2. The bus holdup circuit as recited in claim 1 wherein said energy storage circuit comprises a capacitor.

3. The bus holdup circuit as recited in claim 1 wherein said inrush limiting circuit comprises a resistor.

4. The bus holdup circuit as recited in claim 1 further comprising a switch, coupled across said inrush limiting circuit, that allows said energy storage circuit to bolster said voltage.

5. The bus holdup circuit as recited in claim 4 wherein said switch is a diode.

6. The bus holdup circuit as recited in claim 1 wherein said DC backplane is free of a central bus holdup circuit.

7. The bus holdup circuit as recited in claim 1 wherein said bus holdup circuit enables said module to be hot-pluggable to said DC backplane.

8. A method of bolstering a bus voltage associated with a distributed power system, comprising:

coupling a backplane interface of a module to a DC backplane of said distributed power system;

storing energy in an energy storage circuit coupled across said backplane interface and dissipating said energy to bolster a voltage across said DC backplane; and limiting an inrush current to said module with an inrush limiting circuit series-coupled to said energy storage circuit.

9. The method as recited in claim 8 wherein said energy storage circuit comprises a capacitor.

10. The method as recited in claim 8 wherein said inrush limiting circuit comprises a resistor.

11. The method as recited in claim 8 further comprising employing a switch, coupled across said inrush limiting circuit, to allow said energy storage circuit to bolster said voltage.

12. The method as recited in claim 11 wherein said switch is a diode.

13. The method as recited in claim 8 wherein said DC backplane is free of a central bus holdup circuit.

14. The method as recited in claim 8 further comprising hot-plugging said module to said DC backplane.

15. A distributed power system, comprising:
    a DC backplane; and
    at least one module removably coupled to said DC backplane and including:
        a circuit board,
        a backplane interface mounted on said circuit board, and
        a module-based bus holdup circuit mounted on said circuit board, including:
            an energy storage circuit, coupled across said backplane interface, adapted to store and dissipate energy to bolster a voltage across said DC backplane; and
            an inrush limiting circuit, series-coupled to said energy storage circuit, adapted to limit an inrush current to said module.

16. The system as recited in claim 15 wherein said energy storage circuit comprises a capacitor.

17. The system as recited in claim 15 wherein said inrush limiting circuit comprises a resistor.

18. The system as recited in claim 15 wherein said module-based bus holdup circuit further comprises a switch, coupled across said inrush limiting circuit, that allows said energy storage circuit to bolster said voltage.

19. The system as recited in claim 18 wherein said switch is a diode.

20. The system as recited in claim 15 wherein said module-based bus holdup circuit enables said module to be hot-pluggable to said DC backplane.

\* \* \* \* \*